United States Patent [19]
Bago

[11] 3,887,334
[45] June 3, 1975

[54] OXYGEN METER
[76] Inventor: Julius Bago, 83-10 35th Ave., Jackson Heights, N.Y. 11372
[22] Filed: Apr. 13, 1973
[21] Appl. No.: 350,305

[52] U.S. Cl......... 23/232 E; 23/230 PC; 23/253 PC; 23/254 E; 73/190 R; 73/191
[51] Int. Cl....................... G01n 25/32; G01n 31/12
[58] Field of Search........... 23/237 E, 254 E, 255 E, 23/230 PC, 253 PC; 73/190 R, 191 R, 36

[56] References Cited
UNITED STATES PATENTS
| | | | |
|---|---|---|---|
| 1,067,908 | 7/1913 | Fery | 73/191 |
| 1,205,704 | 11/1916 | Breyer | 73/190 R |
| 1,390,497 | 9/1921 | Chance | 23/255 E |
| 2,052,181 | 8/1936 | Krogh | 73/190 R |

*Primary Examiner*—Robert M. Reese
*Attorney, Agent, or Firm*—Pennie & Edmonds

[57] ABSTRACT

For measurement of the oxygen in the atmosphere a closed vessel is provided with inlet and outlet valves, air-pumping means connected to one of those valves, a heating element to deliver heat to the interior of the vessel, a fuel container in the vessel, a duct disposed in the vessel above the container, means to ignite the fuel in the container, and means to measure the temperature in the duct.

7 Claims, 1 Drawing Figure

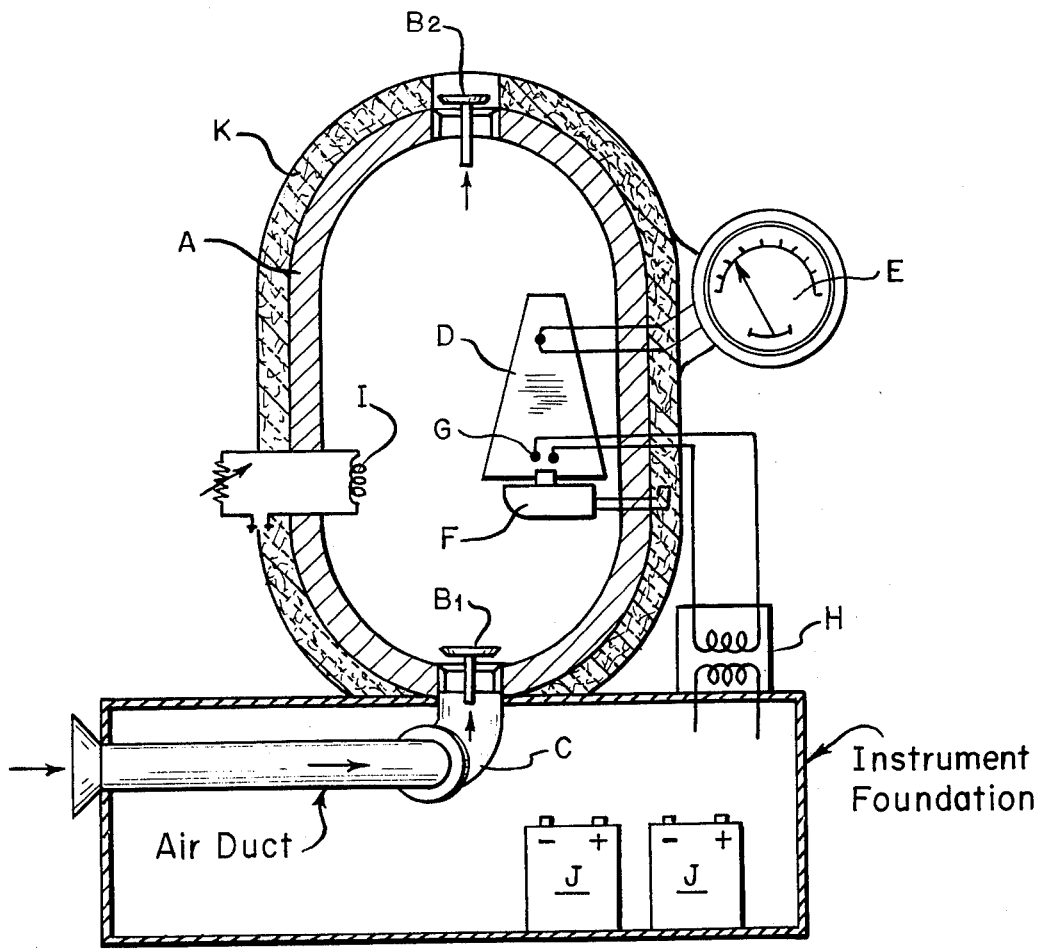

OXYGEN METER

The present invention relates to an instrument, and with it a system for the measurement and indication of the oxygen content of the atmosphere in a room, or outdoors.

It is one object of the present invention to provide an instrument and thus, means to measure the oxygen content of the atmosphere in private dwellings and public spaces, and further, to provide visual indication of the oxygen content of the atmosphere, in which the measurement is taken, by manual actuation of the instrument.

It is another objective of the present invention to provide an instrument and thus, the means to measure the oxygen content of the atmosphere in offices, factories, and other public spaces, measurement and indication being performed by automatic actuation of the instrument, programmed to perform measurements at preset time intervals.

It is a further object of the present invention to provide an instrument and thus, the means to measure, indicate, and record graphically the oxygen content of the atmosphere in certain hospital rooms, and other spaces, where the continuous monitoring and controlling of the oxygen content of the atmosphere is of vital importance.

BRIEF DESCRIPTION OF THE DRAWINGS

With these objectives in view, the present invention is best described and understood when read in connection with the accompanying drawing wherein the single FIGURE is a schematic diagram of apparatus according to the invention for measuring the oxygen content of the atmosphere, including a vertical section through a closable insulated vessel forming part of the apparatus.

DESCRIPTION OF THE PREFERRED EMBODIMENT

The principal component of the instrument shown in the drawing is the combustion chamber (A), in which the oxygen of the atmosphere supports the combustion of a certain quantity of fuel; the chamber is made of heat resistant material, properly insulated by the lagging material (K). The shape and dimension of the combustion chamber (A) largely depends on the type and size of the temperature sensing elements which are accommodated within the chamber.

The instrument further consists of the following component parts:

The inlet valve ($B_1$), located in the inlet opening at the lower end of the combustion chamber (A), and the exhaust valve ($B_2$), located in the exhaust opening at the upper end of the combustion chamber (A).

The exhauster (C) which evacuates the chamber of the air diluted by the combustion products, and in turn, introduces air from the ambient atmosphere into the chamber.

The flue-duct (D) of conical shape, located within the combustion chamber (A), in a vertical position, with its smaller diameter end pointing up.

The fuel burner (F) with storage tank, located at the lower end of the flue duct (D), so arranged, that the fuel storage tank can be replenished from the outside of the combustion chamber (A).

The ignition electrodes (G) located within the lower part of the flue duct (D), above the fuel burner (F); the spark created between the electrode points when energized from the transformer (H) located outside the combustion chamber (A), causes ignition of the burner-oil gases emerging from the fuel burner (F).

The temperature sensing elements (thermocouples) located within the flue duct (D) at its upper end, and are connected to the thermometer (E) located outside the combustion chamber (A).

The heating element (I) located inside the combustion chamber (A). It is energized from the external storage batteries to establish a predetermined temperature in the combustion chamber (A), each time after the chamber has been charged with ambient air, thus, providing the same initial temperature condition prior to taking measurement. Hence, the effect of the varying ambient temperature, on the measurements is eliminated.

The storage batteries (J) located within the sheet-metal foundation of the instrument.

Finally, the heat insulation lagging (K) of the combustion chamber (A), to minimize any propagation of heat from/into the combustion chamber (A).

PRINCIPLE OF OPERATION

First, the combustion chamber (A) is scavenged by the exhauster (C), which supplies ambient air into the chamber through inlet valve ($B_1$), thereby displacing the contaminated chamber atmosphere through exhaust valve ($B_2$). Closing of the valve, then, isolates the chamber atmosphere from the ambient. Subsequently, the heating element (I) is energized, to establish a predetermined temperature of the chamber atmosphere, as indicated by the motion of the hand of the thermometer (E) to a marked point of the scale.

The oxygenmeter is now in a "ready for measurement" condition. Measuring process is triggered by energizing the ignition electrodes (G), from the transformer (H). The resulting spark between the points of the electrodes, which by now, is surrounded by the inflammable gases emerging from the fuel burner or container (F), promptly ignites the gas-cloud. The resulting combustion process of very short duration, develops a maximum temperature, of which magnitude depends on the amount of oxygen available in the chamber atmosphere. The hot combustion products are carried by the conical flue duct (D) to the temperature sensing elements (thermocouples) of the thermometer (E). The scale of the thermometer is calibrated to show the quantity of oxygen which has enabled the combustion to develop the final temperature.

Thus, the oxygenmeter directly indicates the exact percentage of the oxygen, present in the atmosphere of the room, in which the measurement is taken.

The operation of the instrument described above can be initiated manually, or automatically by the inclusion of an electrically operated mechanism, which actuates the measuring process at programmed time intervals.

Stationary instruments can be powered with utility's current, while portable type instruments, with storage batteries.

I claim:

1. The method of measuring the oxygen content of the atmosphere which comprises enclosing a sample of the atmosphere in a closed vessel, delivering fuel to the interior of the vessel, igniting the fuel, and measuring the temperature at a point within the vessel.

2. The method according to claim 1 comprising the further step of raising the temperature of the sample to a predetermined level prior to igniting the fuel.

3. Appartaus for measuring the oxygen content of the atmosphere comprising a closable insulated vessel, a fuel container in the vessel, a duct disposed in the vessel above the container, means to ignite fuel in the container, and means to measure the temperature at a point in the duct.

4. Apparatus according to claim 3 further including means to deliver heat to the interior of the vessel.

5. Apparatus according to claim 3 in which the duct has the shape of a conical frustum with its large end downwards.

6. Apparatus according to claim 3 further including inlet and outlet valves to the vessel.

7. Apparatus according to claim 6 further including air-pumping means connected to one of the valves.

* * * * *